(12) United States Patent
Song (10) Patent No.: US 11,541,735 B2
(45) Date of Patent: Jan. 3, 2023

(54) DOOR SEALING STRUCTURE OF VEHICLE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/346,543

(22) Filed: Jun. 14, 2021

(65) Prior Publication Data

US 2022/0219517 A1     Jul. 14, 2022

(30) Foreign Application Priority Data

Jan. 11, 2021  (KR) ................ 10-2021-0003340

(51) Int. Cl.
  *B60J 10/84*   (2016.01)
  *B62D 25/04*   (2006.01)
  *B60J 10/30*   (2016.01)
  *B62D 25/06*   (2006.01)
  *B62D 25/02*   (2006.01)

(52) U.S. Cl.
  CPC .............. *B60J 10/84* (2016.02); *B60J 10/30* (2016.02); *B62D 25/04* (2013.01); *B62D 25/02* (2013.01); *B62D 25/025* (2013.01); *B62D 25/06* (2013.01)

(58) Field of Classification Search
  CPC ... B60J 10/84; B60J 10/85; B60J 10/30; B60J 10/40; B60J 10/26; B62D 25/04; B62D 25/02; B62D 25/025; B62D 25/06
  USPC .......................... 296/146.9; 49/484.1, 496.1
  See application file for complete search history.

(56) References Cited

U.S. PATENT DOCUMENTS

| | | | |
|---|---|---|---|
| 6,929,307 B1 * | 8/2005 | Grimm | B60J 5/0405 |
| | | | 296/146.7 |
| 10,093,160 B2 * | 10/2018 | Nojiri | B60J 10/84 |
| 10,336,375 B2 * | 7/2019 | Nakamoto | B62D 29/007 |

FOREIGN PATENT DOCUMENTS

JP          4706549 B2 *   6/2011

* cited by examiner

*Primary Examiner* — Dennis H Pedder
(74) *Attorney, Agent, or Firm* — Slater Matsil, LLP (57) ABSTRACT

An embodiment door sealing structure of a monocoque type vehicle body having an overlap of a side inner panel, a side outer reinforce panel, and a side outer panel, and having a side seal panel and a side roof panel combined with the overlap, for providing a seal between a door opening of the vehicle body and a door frame mounted on the door opening is provided. An embodiment door sealing structure includes an insert flange formed toward a vehicle interior along an entirety of a boundary of the door opening over a plurality of joints interconnecting the side inner panel, the side seal panel, and the side roof panel and a first weather strip mounted on the insert flange and configured to form a seal between the vehicle interior and a vehicle exterior.

20 Claims, 9 Drawing Sheets

FIG. 1 rearward ←——→ frontward

DOOR SEALING STRUCTURE OF VEHICLE

CROSS-REFERENCE TO RELATED APPLICATIONS

This application claims the benefit of Korean Patent Application No. 10-2021-0003340, filed in the Korean Intellectual Property Office on Jan. 11, 2021, which application is hereby incorporated herein by reference.

TECHNICAL FIELD

The present invention relates to a door sealing structure of a vehicle.

BACKGROUND

In general, vehicle body types are classified into a frame type and a monocoque type.

The frame type includes a frame as a basic skeleton of the vehicle and a vehicle body mounted on the frame, and is frequently called a body-on-frame type.

In contrast, the monocoque type refers to a structure in which the shell formed by welding panels or members forms a whole structure without a component acting as the frame.

The monocoque type vehicle has low cost and high productivity due to the simplified manufacturing process. The monocoque type vehicle has a high degree of freedom with respect to the interior and exterior of the vehicle body, and the weight of the vehicle is light, providing a merit of good fuel efficiency.

For passenger vehicles traveling on paved roads, a monocoque body is typically employed, and for SUVs or commercial vehicles traveling on rough roads such as unpaved roads, frame bodies are typically employed.

Recently, there is a trend of maximizing the structural strength of the monocoque type and adopting the monocoque type to the SUVs or commercial vehicles.

The above information disclosed in this Background section is only for enhancement of understanding of the background of the invention, and therefore it may contain information that does not form the prior art that is already known to a person of ordinary skill in the art.

SUMMARY

Embodiments of the present invention provide a door sealing structure of a monocoque type vehicle body having an advantage of improved sealing by employing a triple sealing structure.

An exemplary door sealing structure is provided for a monocoque type vehicle body having an overlap of a side inner panel, a side outer reinforce panel, and a side outer panel, and having a side seal panel and a side roof panel combined with the overlap, for sealing between a door opening of the vehicle body and a door frame mounted on the door opening. The sealing structure may include an insert flange formed toward a vehicle interior along an entire boundary of the door opening through a plurality of joints interconnecting the side inner panel, the side seal panel, and the side roof panel, and a first weather strip mounted on the insert flange to form sealing between the vehicle interior and a vehicle exterior.

The insert flange may include a first flange formed by bending an end portion of the side inner panel corresponding to the boundary of the door opening toward a vehicle interior.

The insert flange may include a second flange formed by bending an end portion of the joints connected to the first flange toward the vehicle interior.

The plurality of joints may include a pair of front joints connecting a front pillar to the side seal panel and the side roof panel, a pair of center joints connecting a center pillar to the side seal panel and the side roof panel, and a pair of rear joints connecting a rear pillar to the side seal panel and the side roof panel.

The insert flange may include a third flange formed by bending end portions of an upper surface on the side seal panel corresponding to the door opening interposed among the front joint, the center joint, and the rear joint toward the vehicle interior.

The insert flange may include a fourth flange formed by bending end portions of a lower surface on the side roof panel corresponding to the door opening interposed among the front joint, the center joint, and the rear joint toward the vehicle interior.

The first weather strip is mounted on the insert flange, and forms a seal between the side inner panel and the door frame by a first lip portion formed extending toward the door opening.

The exemplary door sealing structure may further include a second weather strip mounted on a vehicle exterior side of the side outer panel along the boundary of the door opening, where a second weather strip may be configured to form a seal between the side outer panel and the door frame.

The second weather strip may be mounted on a surface portion of the side outer panel disposed in a vehicle width direction.

The second weather strip may include a second lip portion that extends toward the vehicle exterior of the door opening.

The exemplary door sealing structure may further include a third weather strip mount in the vehicle interior along the boundary of the door frame, where the third weather strip may be configured to form a seal between the side outer panel and the door frame.

The third weather strip may include a third lip portion formed in contact with the second lip portion and extending to surround the boundary of the door frame.

The third weather strip may be mounted in a length direction of the vehicle body through a penetration hole formed on the door frame.

According to a door sealing structure of a vehicle according to an exemplary embodiment, when the door frame is mounted in the vehicle body of a monocoque type, triple sealing may be implemented between the vehicle body and the door frame by the first to third weather strips.

In addition, in a door sealing structure of a vehicle according to an exemplary embodiment, the insert flange is formed along an entire boundary of the door opening and mounted with the first weather strip, and the sealing effect may be enhanced due to continuity of the first weather strip.

Other effects that may be obtained or are predicted by exemplary embodiments will be explicitly or implicitly described in a detailed description of the present invention. That is, various effects that are predicted according to exemplary embodiments will be described in the following detailed description.

The following elements may be used in connection with the drawings to describe embodiments of the present invention.

| 1: vehicle body | 3: side inner panel |
|---|---|
| 5: side outer reinforce panel | 7: side outer panel |
| 9: side seal panel | 10: side roof panel |
| 11: door opening | 13: door frame |
| 20: front pillar | 30: center pillar |
| 35: rear pillar | 40: joints |
| 41: front joint | 43: center joint |
| 45: rear joint | 50: insert flange |
| 51: first flange | 53: second flange |
| 55: third flange | 57: fourth flange |
| 60: first weather strip | 61: first lip portion |
| 70: second weather strip | 71: second lip portion |
| 73: mounting hole | 80: third weather strip |
| 81: third lip portion | 83: penetration hole |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify embodiments of the present invention, parts that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

Figure 1:
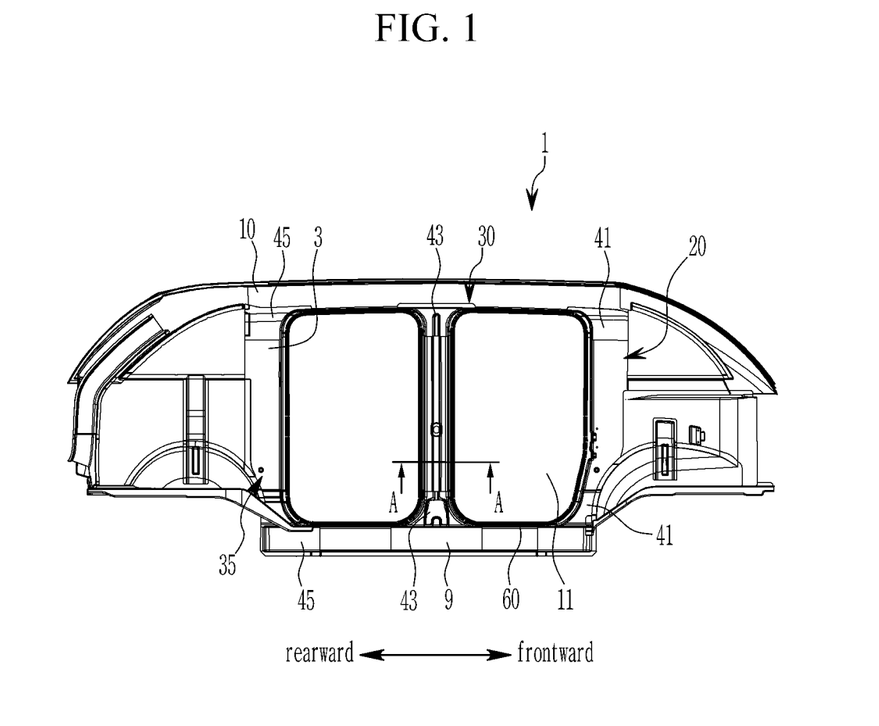
FIG. 1 is a schematic diagram showing a door sealing structure of a vehicle according to an exemplary embodiment.
Figure 2:
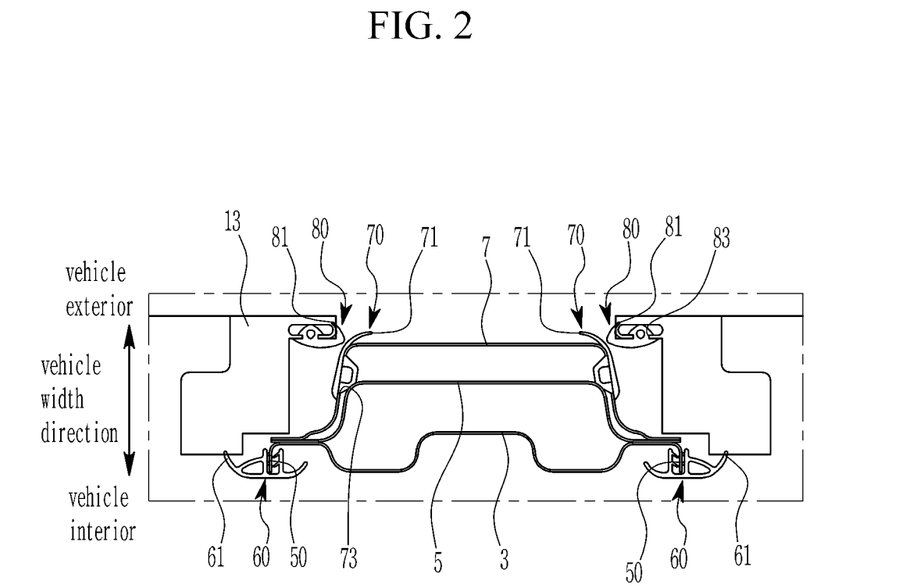
FIG. 2 is a cross-sectional view along a line A-A of FIG. 1.

FIG. 1 is a schematic diagram showing a door sealing structure of a vehicle according to an exemplary embodiment. FIG. 2 is a cross-sectional view along a line A-A of FIG. 1.

Referring to FIG. 1 and FIG. 2, a door sealing structure of a vehicle according to an exemplary embodiment may be applied to a monocoque type vehicle body 1 having an overlap of a side inner panel 3, a side outer reinforce panel 5, and a side outer panel 7 and having a side sill panel 9, and a side roof panel 10 combined with the overlap.

The monocoque type vehicle body 1 is made by forming a closed cross-section by conjoining press-mold component parts through welding or the like.

A door sealing structure of a vehicle according to an exemplary embodiment may be applied for sealing between a door opening 11 of the vehicle body 1 and a door frame 13 mounted on the door opening 11.

The door frame 13 may be a pipe integrally formed by extrusion molding.

For such a purpose, a door sealing structure of a vehicle according to an exemplary embodiment includes a first weather strip 60, a second weather strip 70, and a third weather strip 80.

The first weather strip 60 is mounted on a vehicle interior side of the side inner panel 3 along a boundary of the door opening 11.

The second weather strip 70 is mounted on a vehicle exterior side of the side outer panel 7 corresponding to the door opening 11.

The third weather strip 80 is mounted in the vehicle interior along a boundary of the door frame 13.

The first to third weather strips 60, 70, and 80 are installed along the boundary of the door opening 11, which is the opening and closing part, to block the inflow of rain, dust, dirt and external noise. The first to third weather strips 60, 70, and 80 may also block vibration generated by the door opening and closing.

The first to third weather strips 60, 70, and 80 may have sufficient sealing properties, excellent weather resistance, ozone resistance, water resistance, wear resistance, heat aging resistance, small compress permanent deformation, and good appearance.

The first to third weather strips 60, 70, and 80 are installed in the door opening 11 and may be referred to as "door side weather strips".

The door side weather strip blocks the gap between vehicle body members, between a vehicle body member and a frame, or between frames, preventing inflow of moisture and foreign substances, and reducing wind noise.

Figure 3:
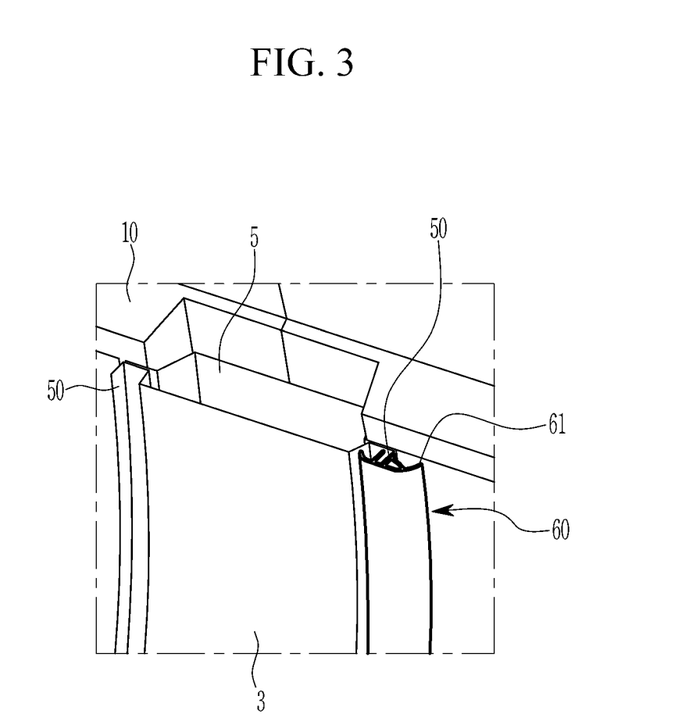
FIG. 3 is a drawing for explaining a first weather strip applied to a door sealing structure of a vehicle according to an exemplary embodiment.

FIG. 3 is a drawing for explaining a first weather strip applied to a door sealing structure of a vehicle according to an exemplary embodiment.

In an exemplary embodiment, the first weather strip 60 is fixed to an insert flange 50 continuously formed over a plurality of joints 40 interconnecting the side inner panel 3, the side sill panel 9, and the side roof panel 10.

Here, the insert flange 50 is formed entirely along the boundary of the door opening 11.

The insert flange 50 includes a first flange 51 formed by bending a frontal end of the side inner panel 3 corresponding to the boundary of the door opening 11 toward the vehicle interior.

In addition, the insert flange 50 includes a second flange 53 formed by bending a frontal end of the joints 40 connected to the first flange 51 toward the vehicle interior.

Figure 4A:
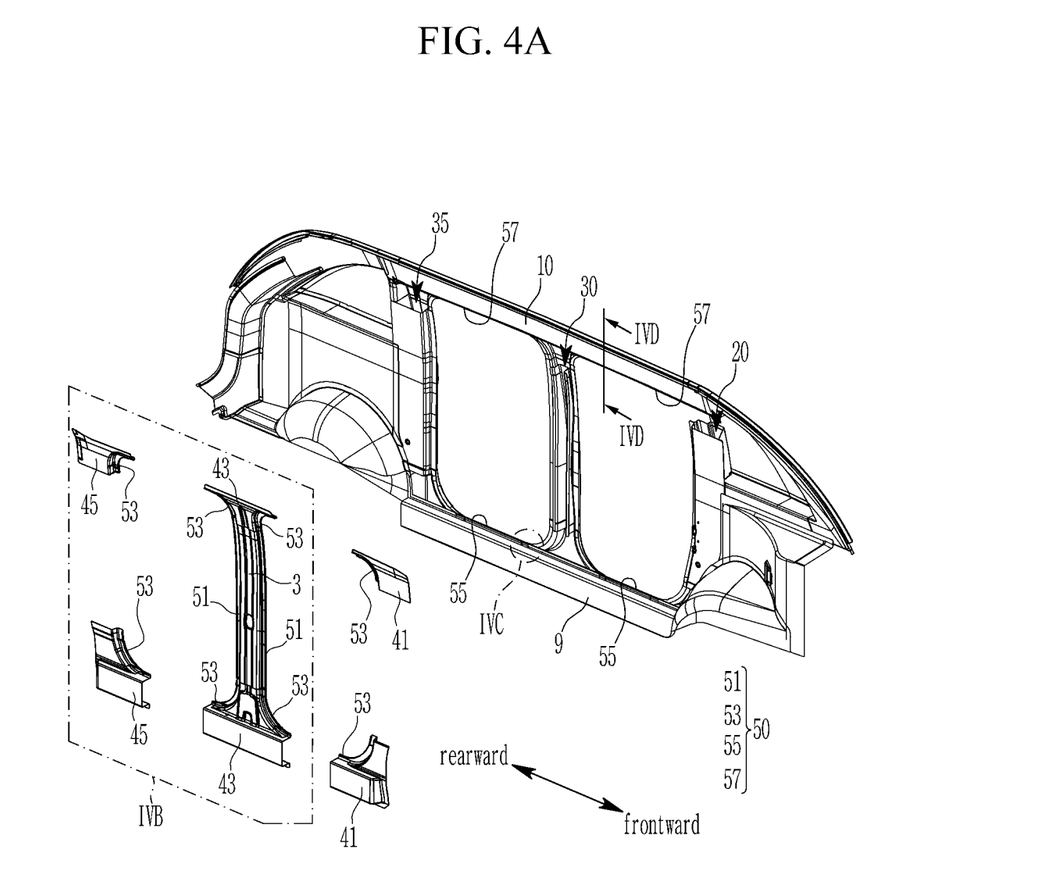
FIG. 4A is a drawing for explaining joints applied to a door sealing structure of a vehicle according to an exemplary embodiment.

The plurality of joints 40 comprises a pair of front joints 41, a pair of center joints 43, and a pair of rear joints 45 that are disposed to the vehicle interior that corresponds to a front pillar 20, a center pillar 30, and a rear pillar 35, respectively (refer to FIG. 4A). The pair of front joints 41 connects the front pillar 20 to the side se sill panel 9 and the side roof panel 10. The pair of center joints 43 connects the center pillar 30 to the side sill panel 9 and the side roof panel 10. The pair of rear joints 45 connects the rear pillar 35 to the side sill panel 9 and the side roof panel 10.

Figure 4B:
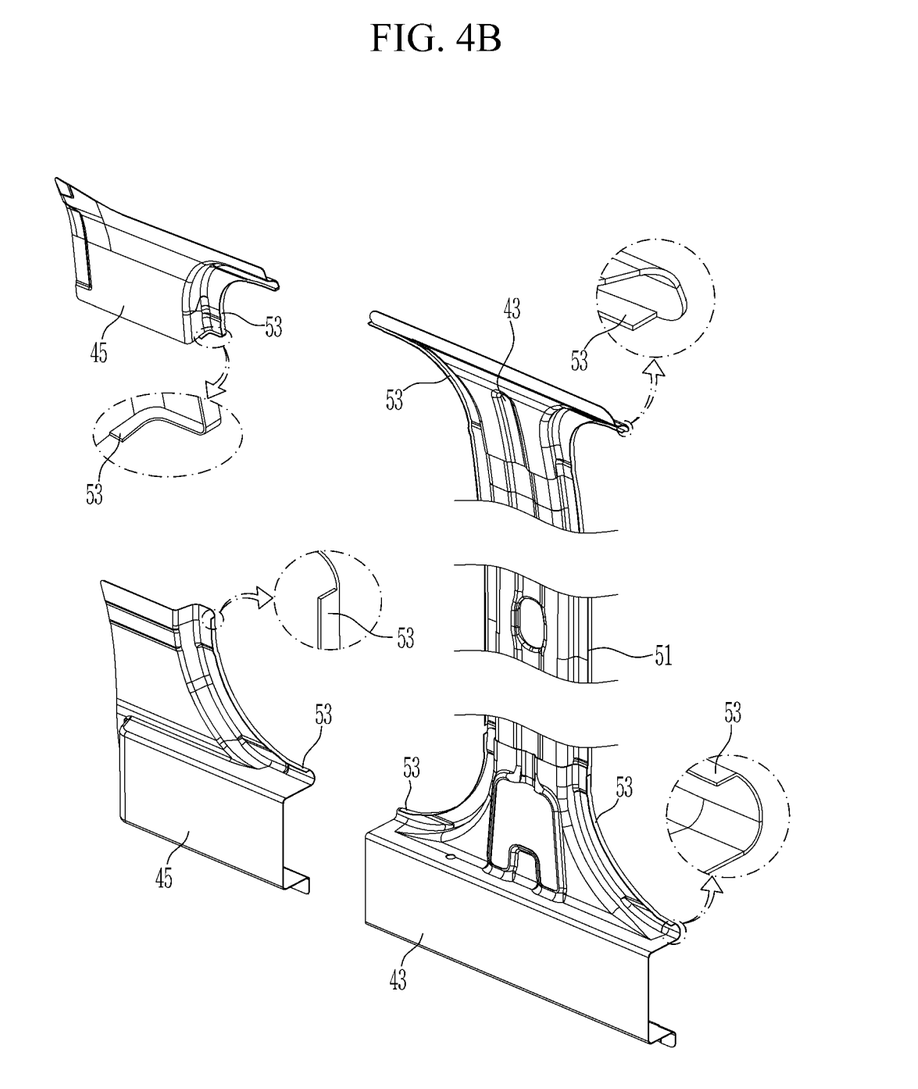
FIG. 4B is an enlarged drawing of a section IVB of FIG. 4A.
Figure 4C:
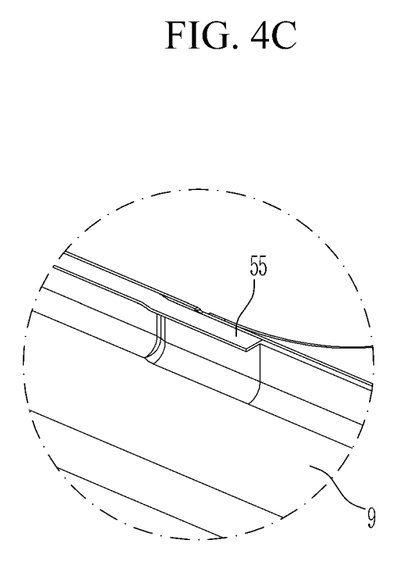
FIG. 4C is an enlarged drawing of a section IVC of FIG. 4A.
Figure 4D:
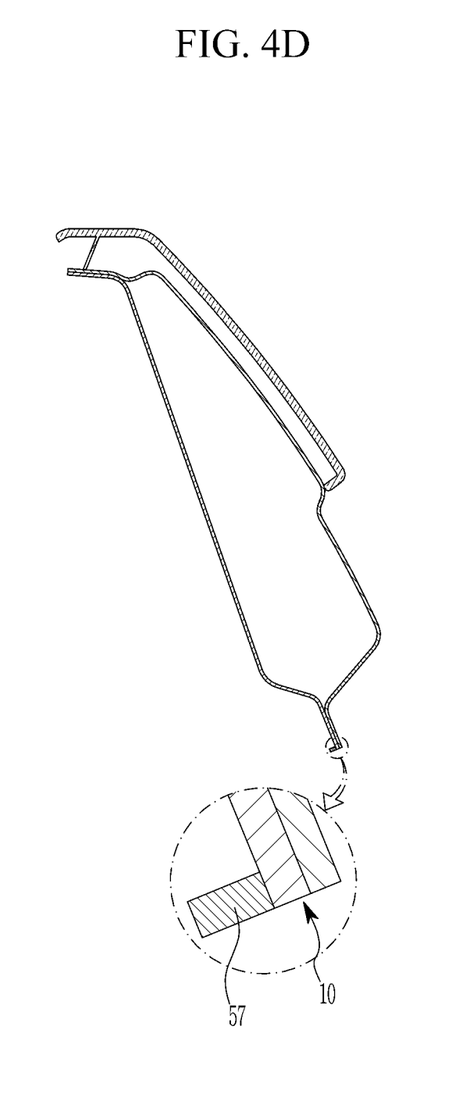
FIG. 4D is a cross-sectional view along a line IVD-IVD of FIG. 4A.

FIG. 4A is a drawing for explaining joints applied to a door sealing structure of a vehicle according to an exemplary embodiment. FIG. 4B is an enlarged drawing of a section IVB of FIG. 4A. FIG. 4C is an enlarged drawing of a section IVC of FIG. 4A. FIG. 4D is a cross-sectional view along a line IVD-IVD of FIG. 4A.

Referring to FIG. 4A to FIG. 4D, the pair of front joints 41 are mounted on vehicle interior sides of the side sill panel 9 and the side roof panel 10, respectively, corresponding to the upper and lower portions of the front pillar 20.

The pair of front joints 41 are welded to the front pillar 20.

The pair of center joints 43 are mounted on vehicle interior sides of the side sill panel 9 and the side roof panel 10, respectively, corresponding to the upper and lower portions of the center pillar 30.

The pair of center joints 43 are welded to the center pillar 30.

In addition, the pair of rear joints 45 are mounted on vehicle interior sides of the side sill panel 9 and the side roof panel 10, respectively, corresponding to the upper and lower portions of the rear pillar 35.

The pair of rear joints 45 are welded to the rear pillar 35.

The front joints 41, the center joints 43, and the rear joints 45 are disposed at positions corresponding to corners of the door opening 11 formed in a generally quadrangle shape.

The second flange 53 is formed at the frontal end connected to the first flange 51 on the front joint 41, the center joint 43, and the rear joint 45.

The second flange 53 may be formed by bending frontal ends of the front joint 41, the center joint 43, and the rear joint 45 connected to the first flange 51 toward the vehicle interior.

In addition, the insert flange 50 includes a third flange 55 formed by bending end portions of an upper surface on the side sill panel 9 corresponding to the door opening 11 interposed among the front joint 41, the center joint 43, and the rear joint 45 toward the vehicle interior.

The insert flange 50 includes a fourth flange 57 formed by bending end portions of a lower surface on the side roof panel 10 corresponding to the door opening 11 interposed among the front joint 41, the center joint 43, and the rear joint 45 toward the vehicle interior.

As described above, the insert flange 50 having the first to fourth flanges 51, 53, 55, and 57 is formed along an entirety of the boundary of the door opening 11.

The first weather strip 60 is mounted on the insert flange 50 and includes a first lip portion 61 formed extending toward the door opening 11.

The first lip portion 61 is configured to contact the door frame 13 to form a seal between the side inner panel 3 and the door frame 13.

Figure 5:
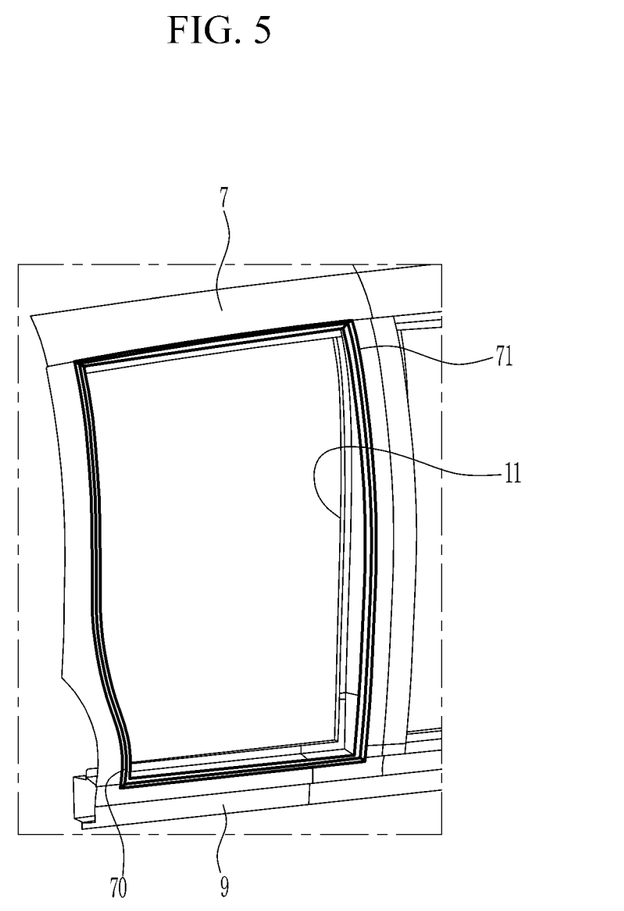
FIG. 5 is a drawing for explaining the second weather strip applied to a door sealing structure of a vehicle according to an exemplary embodiment.

FIG. 5 is a drawing for explaining the second weather strip applied to a door sealing structure of a vehicle according to an exemplary embodiment.

Referring to FIG. 5, in an exemplary embodiment, the second weather strip 70 is mounted on a vehicle exterior side of the side outer panel 7 along the boundary of the door opening 11.

The second weather strip 70 is configured to contact the door frame 13, thereby forming a seal between the side outer panel 7 and the door frame 13.

For such a purpose, the second weather strip 70 is mounted through a mounting hole 73 formed on a surface portion of the side outer panel 7 disposed in a vehicle width direction (refer to FIG. 2). In more detail, referring to an enlarged exploded perspective view in FIG. 2, although the side outer panel 7 generally faces outward, the side outer panel 7 forms the surface portion disposed in a vehicle width direction, e.g., by bending. The mounting hole 73 may be formed on such surface portion, and the second weather strip 70 may be fitted into the mounting hole 73 through a mounting protrusion 72.

The second weather strip 70 includes a second lip portion 71 that extends toward a vehicle exterior of the door opening 11 (refer to FIG. 2).

That is, the second lip portion 71 is formed to extend away from the center of the door opening 11 and is interposed between the side outer panel 7 and the door frame 13.

Figure 6:
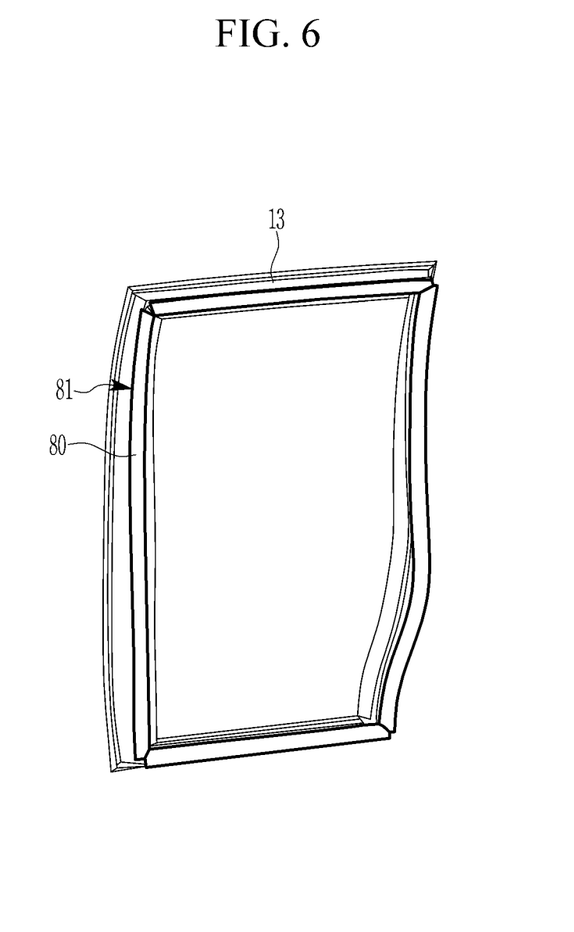
FIG. 6 is a drawing for explaining the third weather strip applied to a door sealing structure of a vehicle according to an exemplary embodiment.

FIG. 6 is a drawing for explaining the third weather strip applied to a door sealing structure of a vehicle according to an exemplary embodiment.

Referring to FIG. 6, in an exemplary embodiment, the third weather strip 80 is mounted in the vehicle interior along the boundary of the door frame 13.

The third weather strip 80 is configured to form a seal between the side outer panel 7 and the door frame 13.

The third weather strip 80 is mounted in a length direction of the vehicle body 1 through a penetration hole 83 formed on the door frame 13.

In addition, the third weather strip 80 includes a third lip portion 81 formed in contact with the second lip portion 71 and extending to surround the boundary of the door frame 13.

That is, the second lip portion 71 and the third lip portion 81 are simultaneously interposed between the side outer panel 7 and the door frame 13.

Therefore, in a door sealing structure of a vehicle according to an exemplary embodiment, when the door frame 13 is mounted in the vehicle body 1 of a monocoque type, triple sealing may be implemented between the vehicle body 1 and the door frame 13 by the first to third weather strips 60, 70, and 80.

In addition, in a door sealing structure of a vehicle according to an exemplary embodiment, the insert flange 50 is formed along an entire boundary of the door opening 11 and mounted with the first weather strip 60, and a sealing effect may be enhanced due to continuity of the first weather strip 60.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A door sealing structure of a monocoque type vehicle body having an overlap of a side inner panel, a side outer reinforce panel, and a side outer panel, and having a side sill panel and a side roof panel combined with the overlap, for providing a seal between a door opening of the vehicle body and a door frame mounted on the door opening, the door sealing structure comprising:
   an insert flange formed inwardly traverse toward a vehicle interior along an entirety of a boundary of the door opening over a plurality of joints interconnecting the side inner panel, the side sill panel, and the side roof panel; and
   a first weather strip mounted on an entire range of the insert flange to form a seal between the vehicle interior and a vehicle exterior.

2. The door sealing structure of claim 1, wherein the insert flange comprises a first flange formed by bending an end portion of the side inner panel corresponding to the boundary of the door opening inwardly transverse toward the vehicle interior.

3. The door sealing structure of claim 2, wherein the insert flange comprises a second flange formed by bending an end portion of the joints connected to the first flange inwardly transverse toward the vehicle interior.

4. The door sealing structure of claim 1, wherein the plurality of joints comprises:
- a pair of front joints connecting a front pillar to the side sill panel and the side roof panel;
- a pair of center joints connecting a center pillar to the side sill panel and the side roof panel; and
- a pair of rear joints connecting a rear pillar to the side sill panel and the side roof panel.

5. The door sealing structure of claim 4, wherein the insert flange comprises a third flange formed by bending end portions of an upper surface on the side sill panel corresponding to the door opening interposed among the front joint, the center joint, and the rear joint inwardly transverse toward the vehicle interior.

6. The door sealing structure of claim 4, wherein the insert flange comprises a fourth flange formed by bending end portions of a lower surface on the side roof panel corresponding to the door opening interposed among the front joint, the center joint, and the rear joint inwardly transverse toward the vehicle interior.

7. The door sealing structure of claim 1, wherein the first weather strip is configured to form a seal between the side inner panel and the door frame by a first lip portion formed extending toward the door opening.

8. A door sealing structure of a monocoque type vehicle body, the door sealing structure comprising:
- an insert flange formed inwardly transverse toward a vehicle interior along an entirety of a boundary of a door opening over a plurality of joints interconnecting a side inner panel, a side sill panel, and a side roof panel;
- a first weather strip mounted on an entire range of the insert flange and configured to form a seal between the vehicle interior and a vehicle exterior; and
- a second weather strip mounted on a vehicle exterior side of a side outer panel along the boundary of the door opening and configured to form a seal between the side outer panel and a door frame mounted on the door opening.

9. The door sealing structure of claim 8, wherein the second weather strip is mounted on a surface portion of the side outer panel disposed in a vehicle width direction.

10. The door sealing structure of claim 8, wherein the second weather strip comprises a second lip portion that extends toward the vehicle exterior side of the door opening.

11. The door sealing structure of claim 10, further comprising a third weather strip mounted in the vehicle interior along the boundary of the door frame, wherein the third weather strip is configured to form a seal between the side outer panel and the door frame.

12. The door sealing structure of claim 11, wherein the third weather strip comprises a third lip portion formed in contact with the second lip portion and extending to surround the boundary of the door frame.

13. The door sealing structure of claim 11, wherein the third weather strip is mounted in a length direction of the vehicle body through a penetration hole formed on the door frame.

14. A vehicle comprising:
- a monocoque type vehicle body comprising:
  - a side inner panel;
  - a side outer reinforce panel;
  - a side outer panel;
  - a side sill panel; and
  - a side roof panel, wherein an overlap is formed with the side inner panel, the side outer reinforce panel, and the side outer panel, and wherein the side sill panel and the side roof panel are combined with the overlap;
- a door opening;
- a door frame mounted on the door opening;
- an insert flange formed inwardly transverse toward an interior of the vehicle along the door opening over a plurality of joints interconnecting the side inner panel, the side sill panel, and the side roof panel; and
- a first weather strip mounted on an entire range of the insert flange and configured to form a seal between the interior of the vehicle and an exterior of the vehicle.

15. The vehicle of claim 14, wherein the insert flange comprises a first flange formed by bending an end portion of the side inner panel corresponding to the door opening toward the interior of the vehicle.

16. The vehicle of claim 15, wherein the insert flange comprises a second flange formed by bending an end portion of the joints connected to the first flange inwardly transverse toward the vehicle interior.

17. The vehicle of claim 14, wherein the plurality of joints comprises:
- a pair of front joints connecting a front pillar to the side sill panel and the side roof panel;
- a pair of center joints connecting a center pillar to the side sill panel and the side roof panel; and
- a pair of rear joints connecting a rear pillar to the side sill panel and the side roof panel.

18. The vehicle of claim 17, wherein the insert flange comprises a third flange formed by bending end portions of an upper surface on the side sill panel corresponding to the door opening interposed among the front joint, the center joint, and the rear joint inwardly transverse toward the vehicle interior.

19. The vehicle of claim 17, wherein the insert flange comprises a fourth flange formed by bending end portions of a lower surface on the side roof panel corresponding to the door opening interposed among the front joint, the center joint, and the rear joint inwardly transverse toward the vehicle interior.

20. The vehicle of claim 14, wherein the first weather strip is configured to form a seal between the side inner panel and the door frame by a first lip portion formed extending toward the door opening.

* * * * *